(12) United States Patent
Chang

(10) Patent No.: US 11,057,224 B1
(45) Date of Patent: Jul. 6, 2021

(54) METHOD AND SYSTEM FOR PERFORMING PHYSICAL UNCLONABLE FUNCTION GENERATED BY NON-VOLATILE MEMORY WRITE DELAY DIFFERENCE

(71) Applicant: NATIONAL TSING HUA UNIVERSITY, Hsinchu (TW)

(72) Inventor: Meng-Fan Chang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 47 days.

(21) Appl. No.: 16/729,512

(22) Filed: Dec. 30, 2019

(51) Int. Cl.
 *G11C 11/34* (2006.01)
 *H04L 9/32* (2006.01)
 *G11C 16/10* (2006.01)

(52) U.S. Cl.
 CPC ............ *H04L 9/3278* (2013.01); *G11C 16/10* (2013.01); *H04L 2209/12* (2013.01)

(58) Field of Classification Search
 CPC .... H04L 9/3278; H04L 2209/12; G11C 16/10
 USPC ...................................................... 365/185.4
 See application file for complete search history.

(56) References Cited

U.S. PATENT DOCUMENTS

| | | | | |
|---|---|---|---|---|
| 7,382,661 B1 * | 6/2008 | Lin | ......... | G11C 16/10 |
| | | | | 365/185.19 |
| 8,059,447 B2 * | 11/2011 | Scheuerlein | ....... | G11C 13/0026 |
| | | | | 365/148 |
| 9,281,029 B2 * | 3/2016 | Cernea | ............... | G11C 13/0021 |
| 2019/0341107 A1 * | 11/2019 | Bertin | .................. | G11C 29/021 |

* cited by examiner

*Primary Examiner* — Hoai V Ho
(74) *Attorney, Agent, or Firm* — CKC & Partners Co., LLC

(57) ABSTRACT

A method for performing a physical unclonable function generated by a non-volatile memory write delay difference includes a resetting step, a writing step, a detecting step, a terminating step and a write-back operating step. The resetting step includes resetting two non-volatile memory cells controlled by a bit line and a bit line bar, respectively. The writing step includes performing a write operation on each of the two non-volatile memory cells. The detecting step includes detecting a voltage drop of each of the bit line and the bit line bar, and comparing the voltage drop and a predetermined voltage difference value to generate a comparison flag. The terminating step includes terminating the write operation on one of the two non-volatile memory cells according to the comparison flag. The write-back operating step includes performing a write-back operation on another of the two non-volatile memory cells.

20 Claims, 15 Drawing Sheets

100a

METHOD AND SYSTEM FOR PERFORMING PHYSICAL UNCLONABLE FUNCTION GENERATED BY NON-VOLATILE MEMORY WRITE DELAY DIFFERENCE

BACKGROUND

Technical Field

The present disclosure relates to a method and a system for performing a physical unclonable function. More particularly, the present disclosure relates to a method and a system for performing a physical unclonable function generated by a non-volatile memory write delay difference.

Description of Related Art

Physical unclonable function (PUF) is a promising solution to provide an encryption key with sufficient randomness as well as chip identification. However, state-of-art non-volatile memory (NVM) PUF has some challenges and issues as follows: (1) The choice of reliable entropy is crucial. (2) A plurality of unstable bits may affect the reliability. (3) An area overhead of PUF shall be minimized. A conventional non-volatile memory PUF requires large area overhead to implement, and the unstable bits may occur. Therefore, a method and a system for performing a physical unclonable function generated by a non-volatile memory write delay difference having the features of decreasing the unstable bits and the area overhead are commercially desirable.

SUMMARY

According to one aspect of the present disclosure, a method for performing a physical unclonable function generated by a non-volatile memory write delay difference includes a resetting step, a writing step, a detecting step, a terminating step and a write-back operating step. The resetting step includes resetting two non-volatile memory cells, and the two non-volatile memory cells are controlled by a bit line and a bit line bar, respectively. The writing step includes performing a write operation on each of the two non-volatile memory cells. The detecting step includes detecting a voltage drop of each of the bit line and the bit line bar, and comparing the voltage drop and a predetermined voltage difference value to generate a comparison flag. The terminating step includes terminating the write operation on one of the two non-volatile memory cells according to the comparison flag. The write-back operating step includes performing a write-back operation on another of the two non-volatile memory cells.

According to another aspect of the present disclosure, a method for performing a physical unclonable function generated by a non-volatile memory write delay difference includes a resetting step, a writing step, a detecting step and a terminating step. The resetting step includes resetting two non-volatile memory cells, and the two non-volatile memory cells are controlled by a bit line and a bit line bar, respectively. The writing step includes performing a write operation on each of the two non-volatile memory cells. The detecting step includes detecting a voltage drop of each of the bit line and the bit line bar, and comparing the voltage drop and a predetermined voltage difference value to generate a comparison flag. The terminating step includes terminating the write operation on each of the two non-volatile memory cells according to the comparison flag.

According to further another aspect of the present disclosure, A system for performing a physical unclonable function generated by a non-volatile memory write delay difference includes a physical unclonable function cell unit, two flag generators and a voltage controller. The physical unclonable function cell unit includes two non-volatile memory cells, a first control transistor and a second control transistor. The first control transistor is connected to a source line, and the second control transistor is connected to a source line bar. The two non-volatile memory cells are controlled by a bit line and a bit line bar, respectively. The two flag generators are electrically connected to the two non-volatile memory cells, respectively. Each of the two flag generators is configured to detect a voltage drop of one of the bit line and the bit line bar, and compare the voltage drop and a predetermined voltage difference value to generate a comparison flag. The voltage controller is electrically connected to the physical unclonable function cell unit and the two flag generators. The voltage controller is configured to implement steps of a method includes resetting two non-volatile memory cells, performing a write operation on each of the two non-volatile memory cells and terminating the write operation on one of the two non-volatile memory cells according to the comparison flag.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Before describing any embodiments in detail, some terms used in the following are described. A voltage level of "1" represents that the voltage is equal to a power supply voltage VDD. The voltage level of "0" represents that the voltage is equal to a ground voltage VSS. A PMOS transistor and an NMOS transistor represent a P-type MOS transistor and an N-type MOS transistor, respectively. Each transistor has a source, a drain and a gate.

Figure 1:
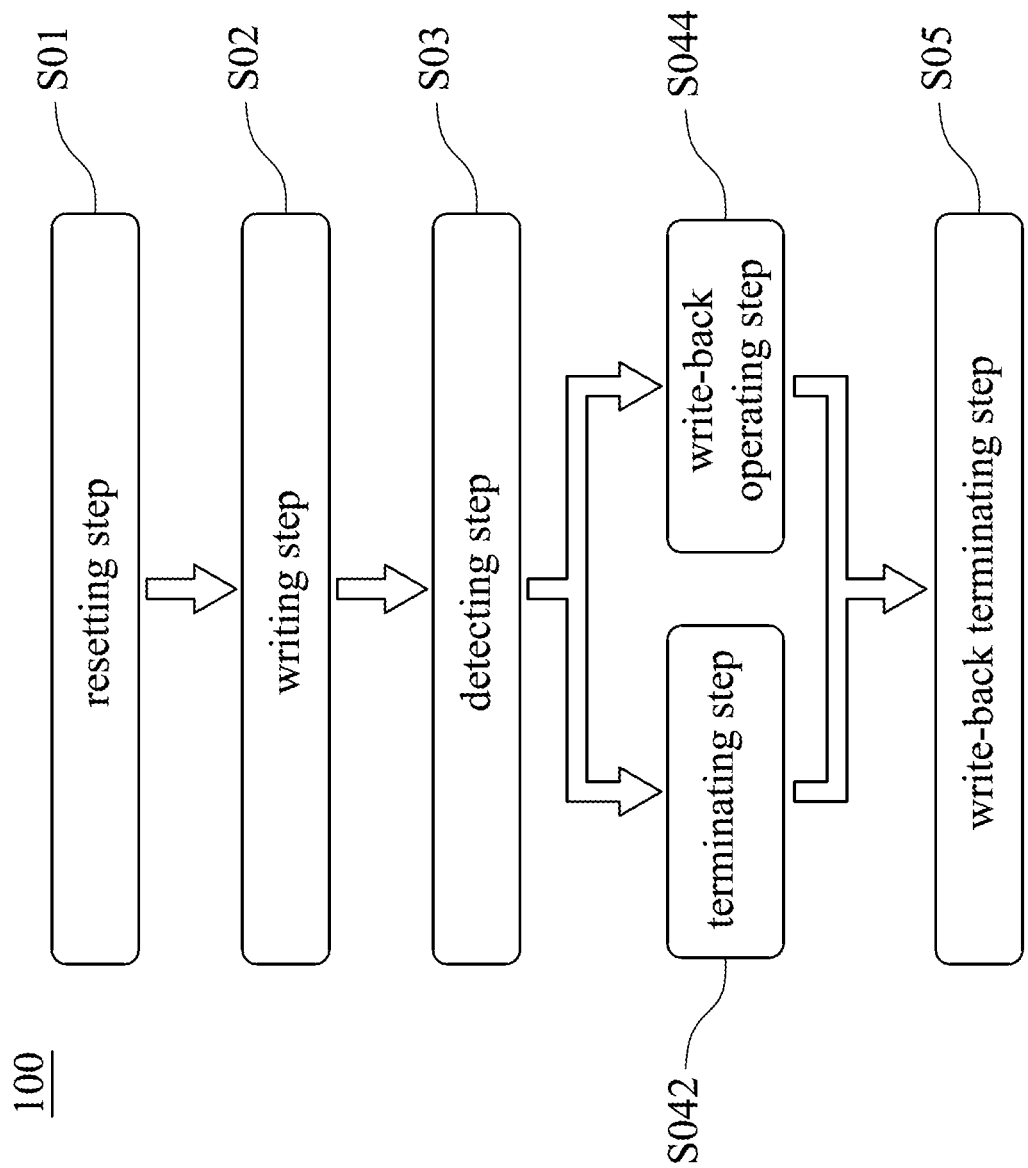
FIG. 1 shows a flow chart of a method for performing a physical unclonable function generated by a non-volatile memory write delay difference according to a first embodiment of the present disclosure.
Figures 2, 3:
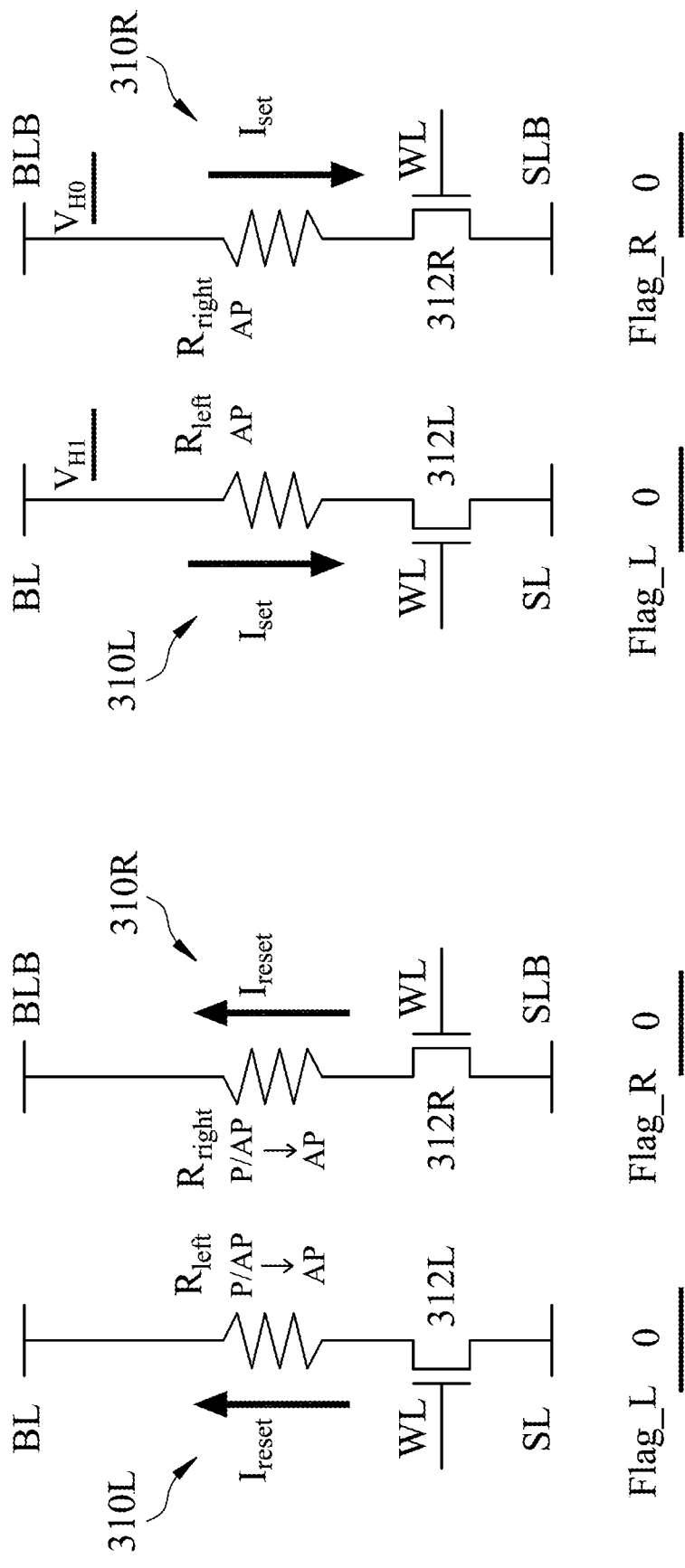
FIG. 2 shows a schematic view of a resetting step of the method for performing the physical unclonable function generated by the non-volatile memory write delay difference of FIG. 1.
FIG. 3 shows a schematic view of a writing step of the method for performing the physical unclonable function generated by the non-volatile memory write delay difference of FIG. 1.
Figure 4:
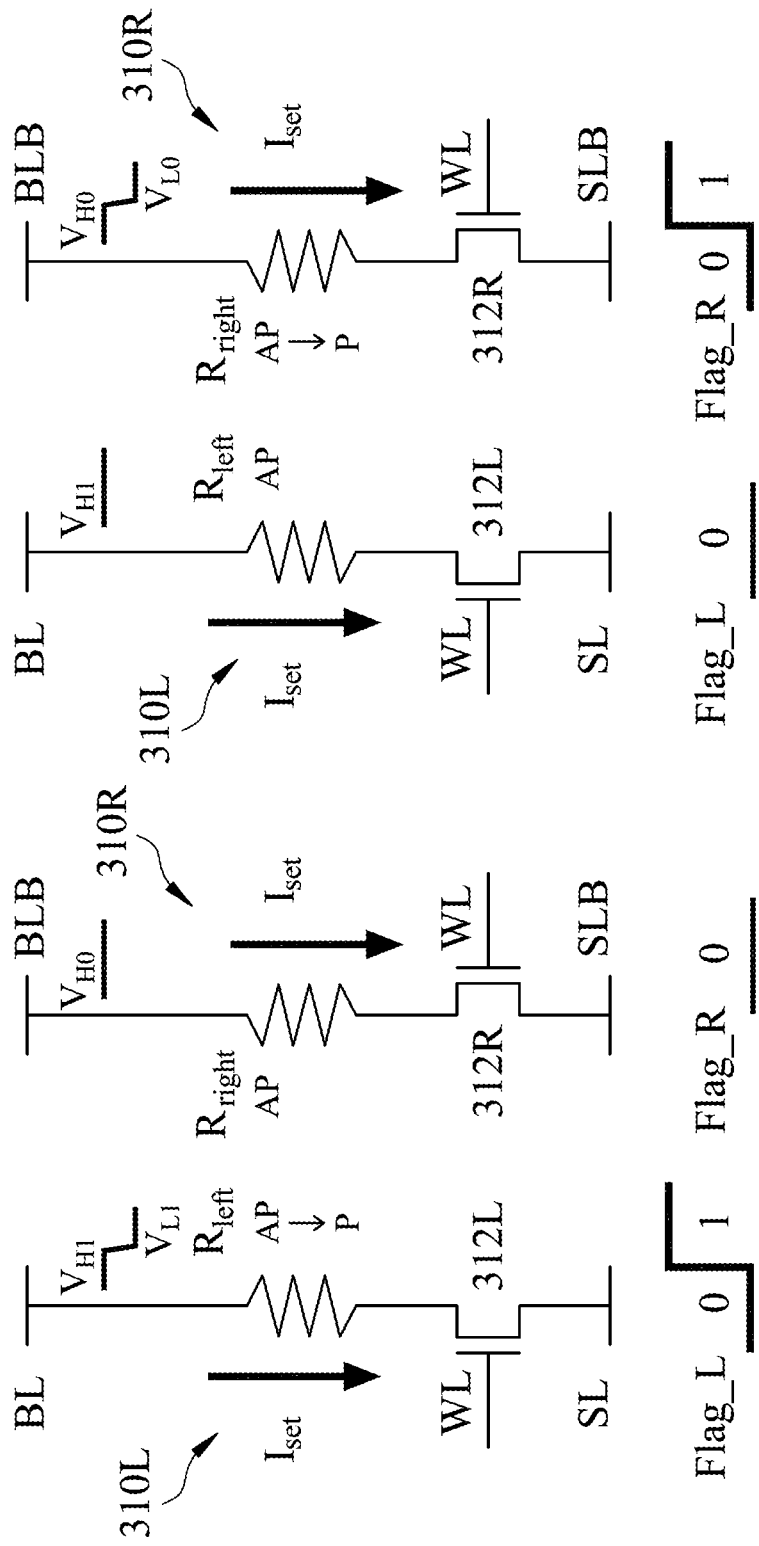
FIG. 4 shows a schematic view of a detecting step of the method for performing the physical unclonable function generated by the non-volatile memory write delay difference of FIG. 1.
Figure 5:
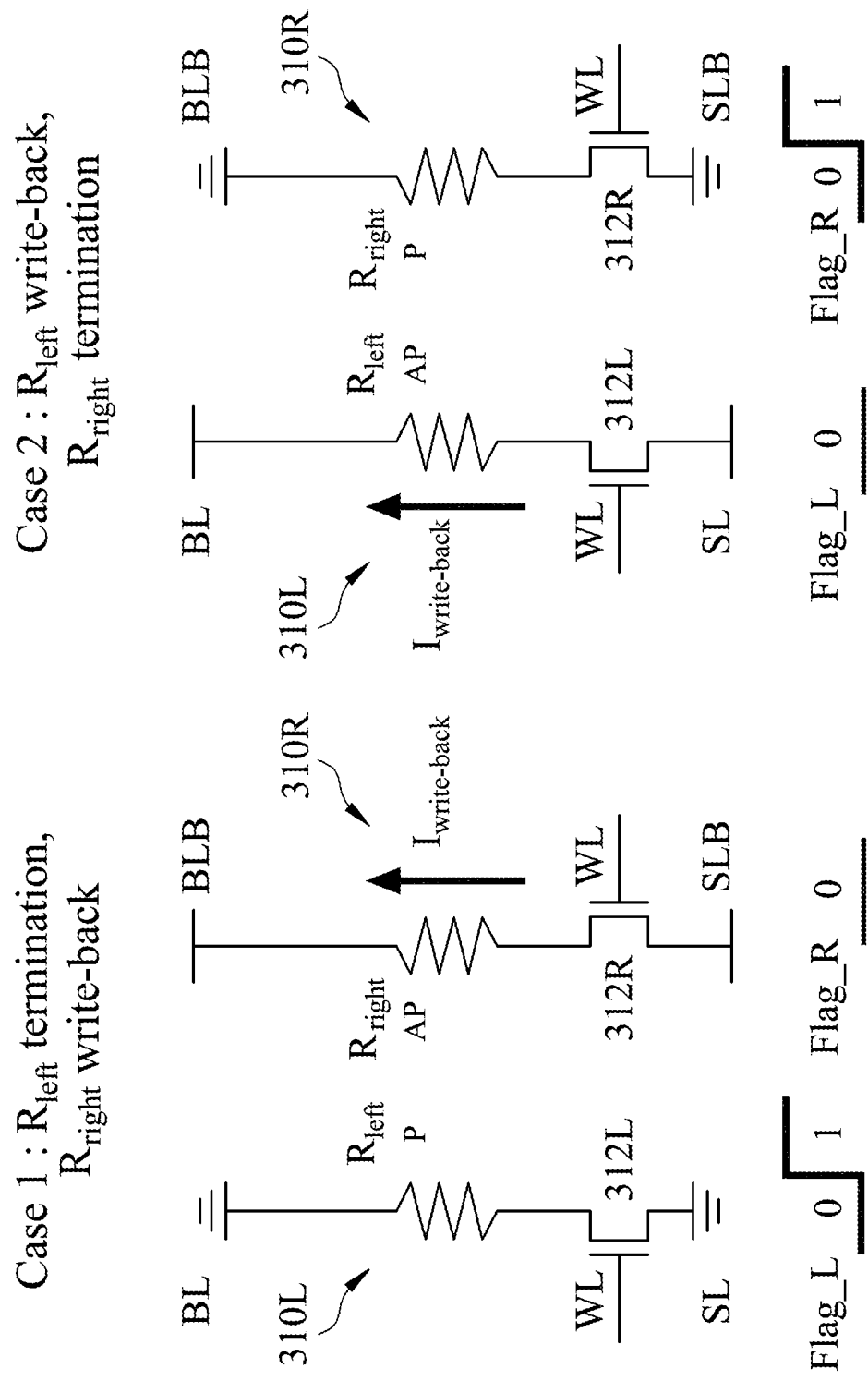
FIG. 5 shows a schematic view of a terminating step and a write-back operating step of the method for performing the physical unclonable function generated by the non-volatile memory write delay difference of FIG. 1.
Figure 6:
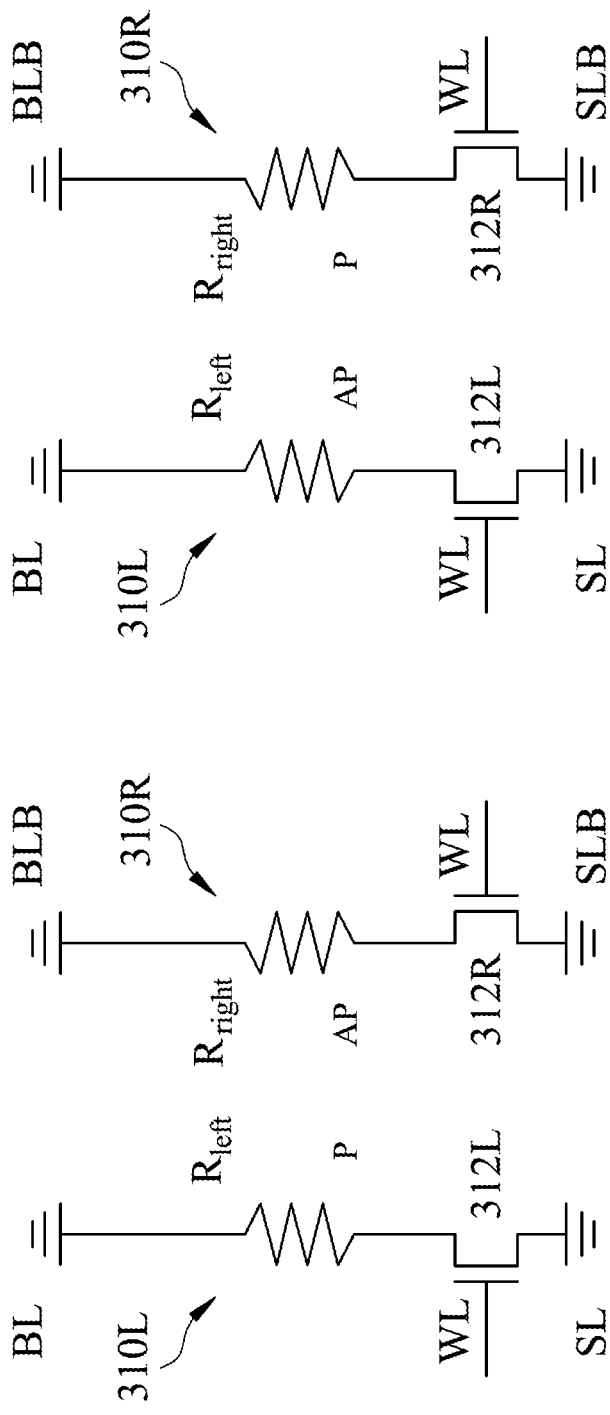
FIG. 6 shows a circuit schematic view of a write-back terminating step of the method for performing the physical unclonable function generated by the non-volatile memory write delay difference of FIG. 1.

FIG. 1 shows a flow chart of a method 100 for performing a physical unclonable function generated by a non-volatile memory write delay difference according to a first embodiment of the present disclosure. FIG. 2 shows a schematic view of a resetting step S01 of the method 100 for performing the physical unclonable function generated by the non-volatile memory write delay difference of FIG. 1. FIG. 3 shows a schematic view of a writing step S02 of the method 100 for performing the physical unclonable function generated by the non-volatile memory write delay difference of FIG. 1. FIG. 4 shows a schematic view of a detecting step S03 of the method 100 for performing the physical unclonable function generated by the non-volatile memory write delay difference of FIG. 1. FIG. 5 shows a schematic view of a terminating step S042 and a write-back operating step S044 of the method 100 for performing the physical unclonable function generated by the non-volatile memory write delay difference of FIG. 1. FIG. 6 shows a circuit schematic view of a write-back terminating step S05 of the method 100 for performing the physical unclonable function generated by the non-volatile memory write delay difference of FIG. 1. In FIGS. 1-6, the method 100 for performing the physical unclonable function generated by the non-volatile memory write delay difference includes a resetting step S01, a writing step S02, a detecting step S03, a terminating step S042, a write-back operating step S044 and a write-back terminating step S05.

The resetting step S01 includes resetting two non-volatile memory cells 310L, 310R, and the two non-volatile memory cells 310L, 310R are controlled by a bit line BL and a bit line bar BLB, respectively, as shown in FIG. 2. In detail, the resetting step S01 further includes resetting each of the two non-volatile memory cells 310L, 310R to an anti-parallel state (AP state) via a reset current $I_{reset}$ passing through each of the bit line BL and the bit line bar BLB. The non-volatile memory cell 310L includes a first magnetic tunnel junction (MTJ) element $R_{left}$. A first control transistor 312L is connected to a source line SL. The first magnetic tunnel junction element $R_{left}$ is connected between the first control transistor 312L and the bit line BL. The non-volatile memory cell 310R includes a second magnetic tunnel junction element $R_{right}$. A second control transistor 312R is connected to a source line bar SLB. The second magnetic tunnel junction element $R_{right}$ is connected between the second control transistor 312R and the bit line bar BLB. No matter each of the two non-volatile memory cells 310L, 310R is in the anti-parallel state or a parallel state (P state), each of the two non-volatile memory cells 310L, 310R is reset to the anti-parallel state.

The writing step S02 includes performing a write operation on each of the two non-volatile memory cells 310L, 310R, as shown in FIG. 3. In detail, the write operation of the writing step S02 includes applying a set current $I_{set}$ to each of the two non-volatile memory cells 310L, 310R. The set current $I_{set}$ passes through each of the bit line BL and the bit line bar BLB, and the set current $I_{set}$ and the reset current $I_{reset}$ flow in opposite directions.

The detecting step S03 includes detecting a voltage drop of each of the bit line BL and the bit line bar BLB, and comparing the voltage drop and a predetermined voltage difference value to generate a comparison flag (Flag_L or Flag_R), as shown in FIG. 4. Moreover, the detecting step S03 further includes in response to determining that the voltage drop of each of the bit line BL and the bit line bar BLB is smaller than the predetermined voltage difference value, maintaining the write operation on each of the bit line BL and the bit line bar BLB. In response to determining that the voltage drop of one of the bit line BL and the bit line bar BLB is greater than or equal to the predetermined voltage difference value, changing the comparison flag (Flag_L or Flag_R). In response to determining that the voltage drop of one of the bit line BL and the bit line bar BLB is smaller than the predetermined voltage difference value, unchanging the comparison flag (Flag_L or Flag_R). The predetermined voltage difference value may be determined according to a process and a structure of each of the non-volatile memory cells 310L, 310R, the first control transistor 312L and the second control transistor 312R.

In Case 1 of FIG. 4, the non-volatile memory cells 310L, 310R include a first magnetic tunnel junction element $R_{left}$ and a second magnetic tunnel junction element $R_{right}$, respectively. The voltage drop of the bit line BL is a difference between two voltage levels $V_{H1}$, $V_{L1}$. When the first magnetic tunnel junction element $R_{left}$ is first switched from the anti-parallel state to the parallel state, the voltage drop of the bit line BL is greater than or equal to the predetermined voltage difference value, so that the comparison flag Flag_L is changed from 0 to 1, and the non-volatile memory cell 310L is set from the anti-parallel state to the parallel state. In the meanwhile, the voltage drop of the bit line bar BLB is smaller than the predetermined voltage difference value (e.g., the bit line bar BLB is maintained at a high voltage level $V_{HO}$), so that the comparison flag Flag_R is unchanged (e.g., the comparison flag Flag_R is maintained at 0), and the non-volatile memory cell 310R is maintained in the anti-parallel state.

In Case 2 of FIG. 4, the voltage drop of the bit line bar BLB is a difference between two voltage levels $V_{HO}$, $V_{LO}$. When the second magnetic tunnel junction element $R_{right}$ is first switched from the anti-parallel state to the parallel state, the voltage drop of the bit line bar BLB is greater than or equal to the predetermined voltage difference value, so that the comparison flag Flag_R is changed from 0 to 1, and the non-volatile memory cell 310R is set from the anti-parallel state to the parallel state. In the meanwhile, the voltage drop of the bit line BL is smaller than the predetermined voltage difference value (e.g., the bit line BL is maintained at a high voltage level $V_{HS}$), so that the comparison flag Flag_L is unchanged (e.g., the comparison flag Flag_L is maintained at 0), and the non-volatile memory cell 310L is maintained in the anti-parallel state.

The terminating step S042 includes terminating the write operation on one of the two non-volatile memory cells 310L, 310R according to the comparison flag, as shown in FIG. 5. In addition, the terminating step S042 further includes in response to determining that the voltage drop of one of the bit line BL and the bit line bar BLB is greater than or equal to the predetermined voltage difference value, terminating the write operation on the one of the two non-volatile memory cells 310L, 310R by applying a voltage level of the one of the bit line BL and the bit line bar BLB to zero, and setting the one of the two non-volatile memory cells 310L, 310R to the parallel state.

The write-back operating step S044 includes performing a write-back operation on another of the two non-volatile memory cells 310L, 310R, as shown in FIG. 5. In addition, the write-back operation of the write-back operating step S044 includes applying a write-back current $I_{write-back}$ to the another of the two non-volatile memory cells 310L, 310R so as to set the another of the two non-volatile memory cells 310L, 310R to the anti-parallel state. The write-back current $I_{write-back}$ passes through another of the bit line BL and the bit line bar BLB, and the write-back current $I_{write-back}$ and the set current $I_{set}$ flow in opposite directions.

In Case 1 of FIG. 5, the write operation on the non-volatile memory cell 310L is terminated according to the comparison flag Flag_L. The comparison flag Flag_L is changed from 0 to 1. The voltage levels of the bit line BL and the source line SL are applied to zero. The non-volatile memory cell 310L is in the parallel state. In the meanwhile, the write-back operation is performed on the non-volatile memory cell 310R. The comparison flag Flag_R is unchanged. The write-back current $I_{write-back}$ is applied to the non-volatile memory cell 310R so as to make sure that the non-volatile memory cell 310R is in the anti-parallel state.

In Case 2 of FIG. 5, the write operation on the non-volatile memory cell 310R is terminated according to the comparison flag Flag_R. The comparison flag Flag_R is changed from 0 to 1. The voltage levels of the bit line bar BLB and the source line bar SLB are applied to zero. The non-volatile memory cell 310R is in the parallel state. In the meanwhile, the write-back operation is performed on the non-volatile memory cell 310L. The comparison flag Flag_L is unchanged. The write-back current $I_{write-back}$ is applied to the non-volatile memory cell 310L so as to make sure that the non-volatile memory cell 310R is in the anti-parallel state.

The write-back terminating step S05 includes terminating the write-back operation on the another of the two non-volatile memory cells 310L, 310R, as shown in FIG. 6. In Case 1 of FIG. 6, the voltage levels of the bit line bar BLB and the source line bar SLB are applied to zero. In Case 2 of FIG. 6, the voltage levels of the bit line BL and the source line SL are applied to zero. Moreover, the steps of the method 100 are carried out in order of the resetting step S01, the writing step S02, the detecting step S03, the terminating step S042 and the write-back terminating step S05. The terminating step S042 and the write-back operating step S044 are carried out simultaneously.

Accordingly, the method 100 of the present disclosure initiates the two non-volatile memory cells 310L, 310R to the anti-parallel state, and then performs the writing step S02 (the anti-parallel state to the parallel state) on the two non-volatile memory cells 310L, 310R. Owing to the write time variation, the one of the two non-volatile memory cells 310L, 310R turns to the parallel state first. For the magnetic tunnel junction that has longer write time, the write-back operating step S044 is performed to write the another of the two non-volatile memory cells 310L, 310R back to the anti-parallel state so as to make sure that the two non-volatile memory cells 310L, 310R are set to be in the anti-parallel state and the parallel state, respectively, thereby avoiding unstable bits. In addition, the method 100 of the present disclosure utilizes the comparison flag (Flag_R and Flag_L) to efficiently monitor whether the one of the two non-volatile memory cells 310L, 310R is successfully written or not. The method 100 of the present disclosure can not only read each of the two non-volatile memory cells 310L, 310R but also provide the write-back operation that enables the two non-volatile memory cells 310L, 310R in each physical unclonable function cell unit exist in complementary state so as to decrease the unstable bits. By combining the read circuit and the write circuit, the method 100 of the present disclosure utilizes the read write combined scheme to greatly decrease the area overhead.

Figure 7:
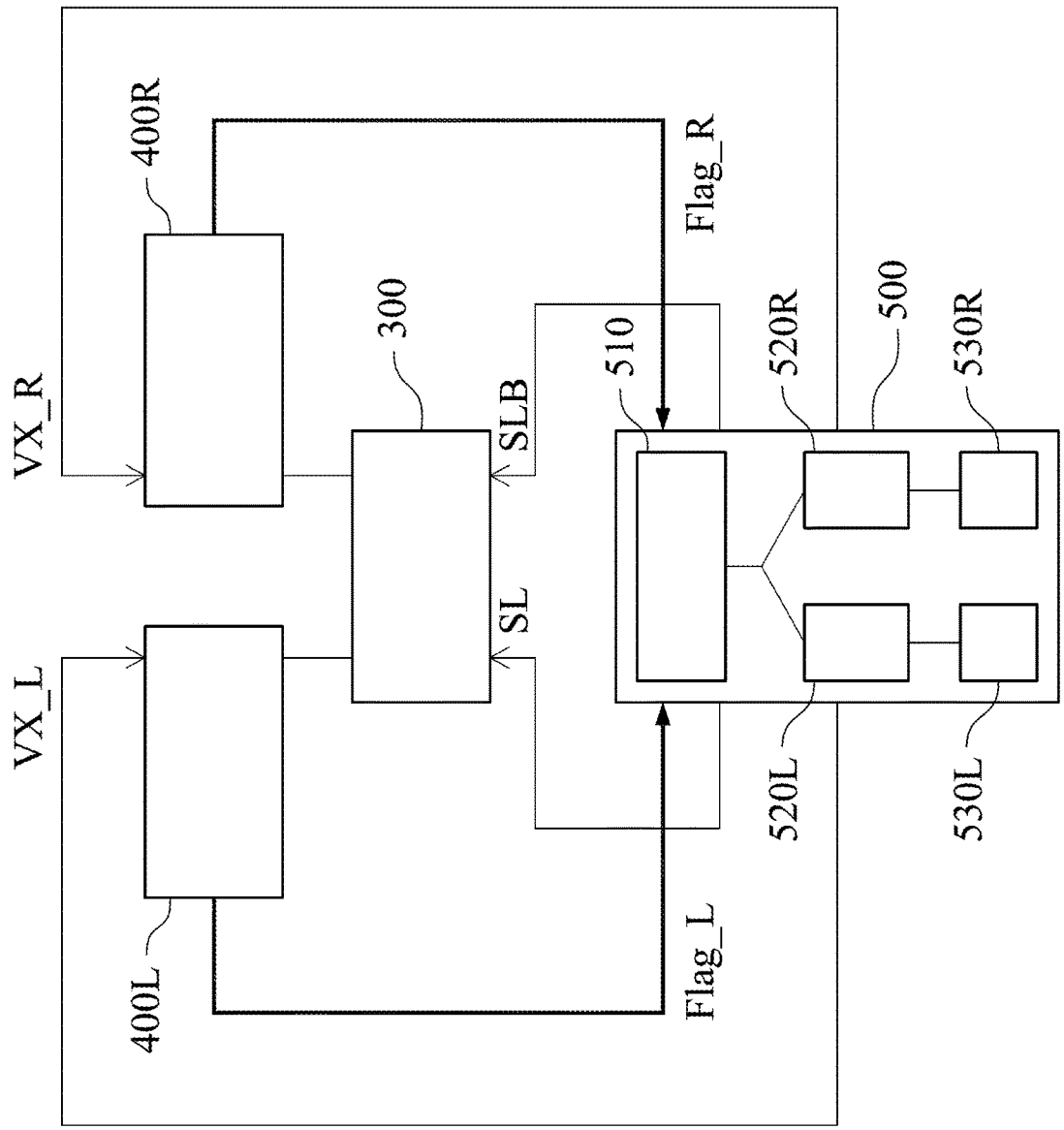
FIG. 7 shows a block diagram of a system for performing a physical unclonable function generated by a non-volatile memory write delay difference according to a second embodiment of the present disclosure.
Figure 8:
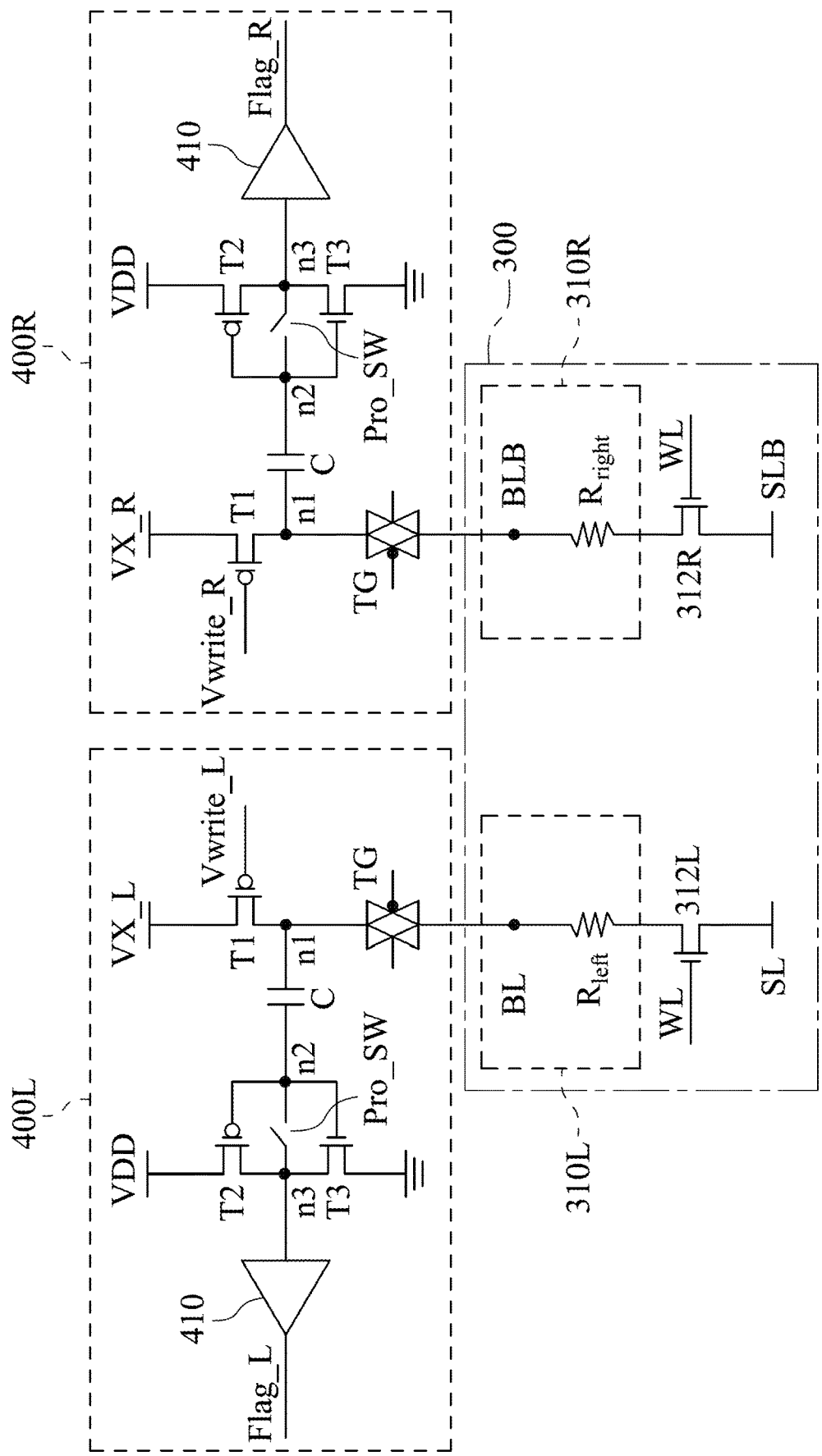
FIG. 8 shows a circuit diagram of a physical unclonable function cell unit and two flag generators of the system for performing the physical unclonable function generated by the non-volatile memory write delay difference of FIG. 7.
Figure 9:
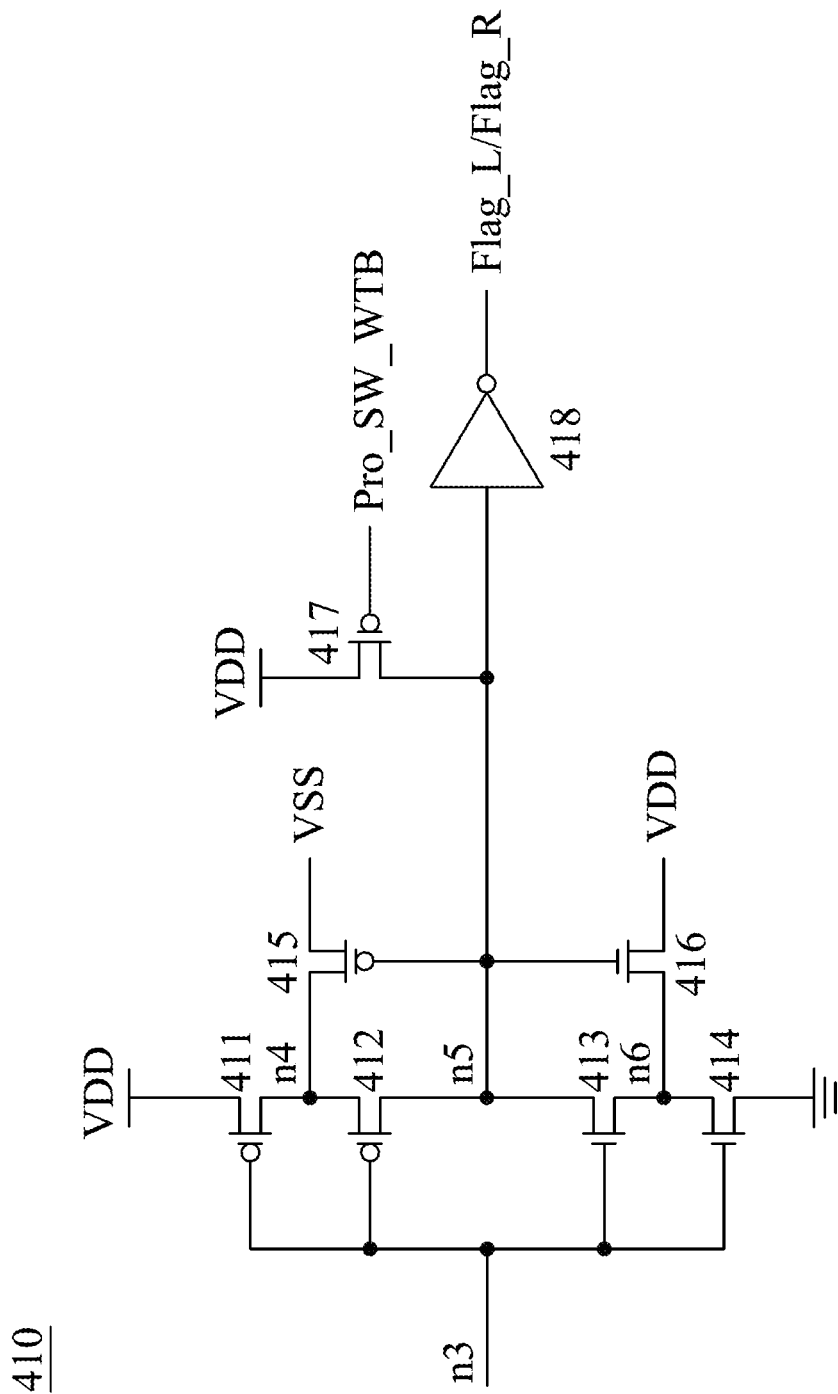
FIG. 9 shows a circuit diagram of an operational amplifier of each of the two flag generators of FIG. 8.
Figure 10:
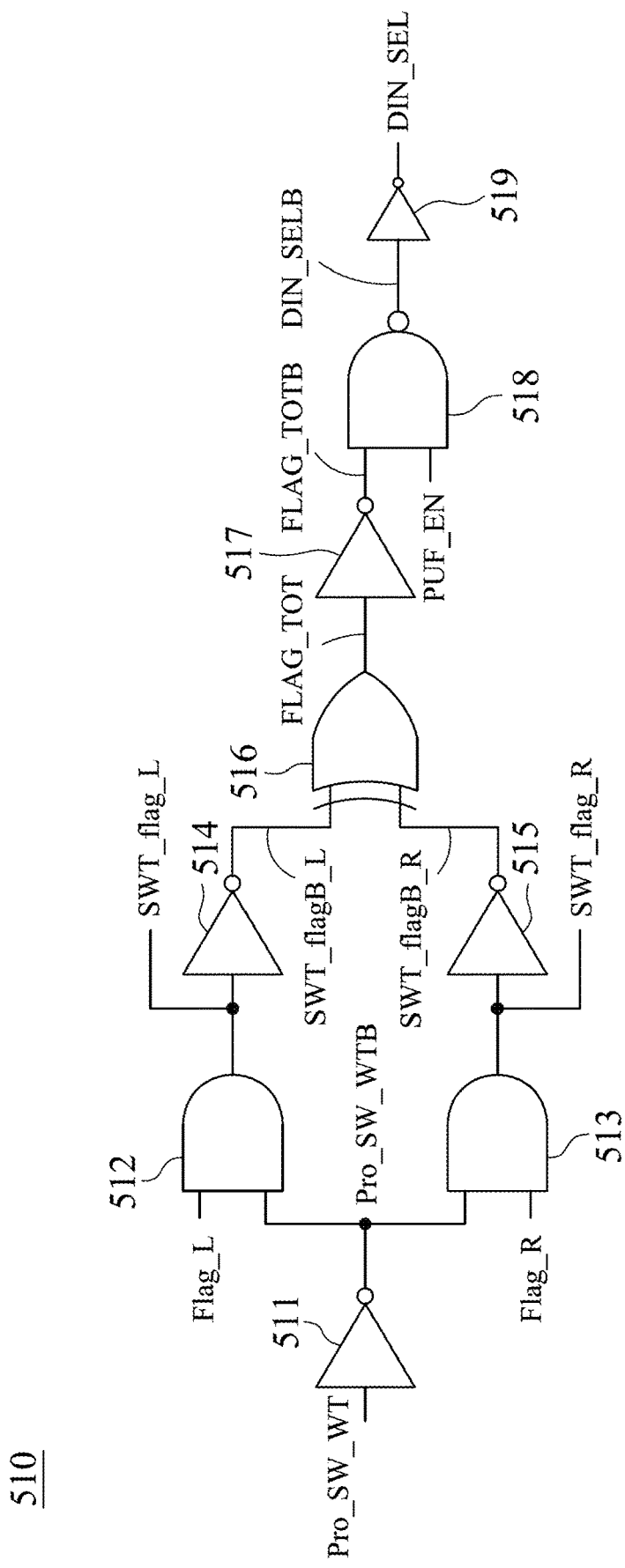
FIG. 10 shows a circuit diagram of a first voltage control circuit of a voltage controller of the system of FIG. 7.
Figure 11:
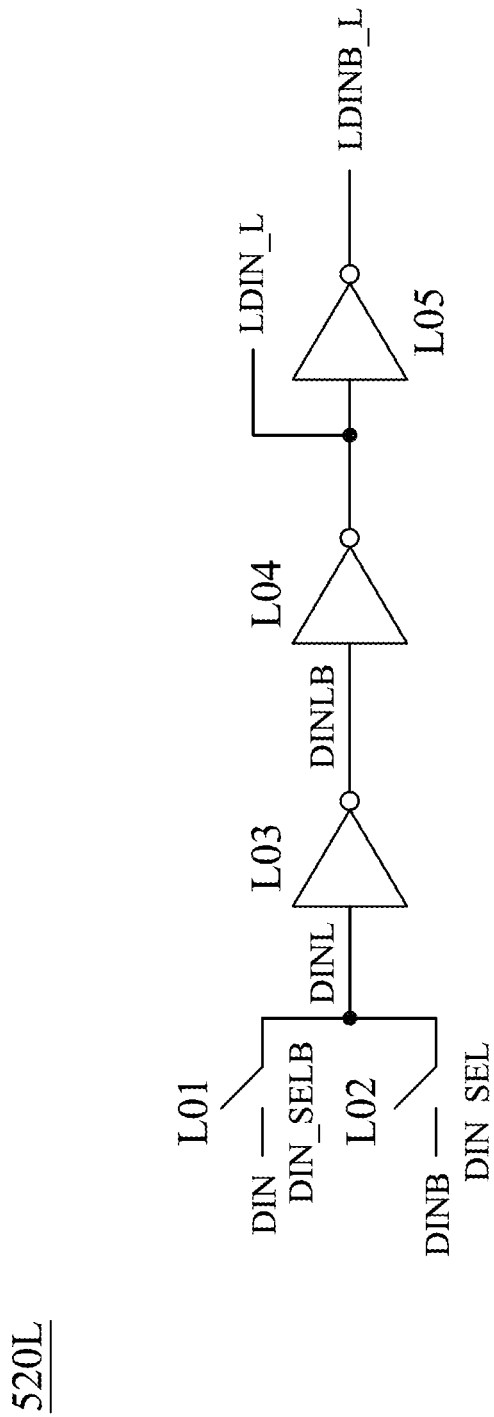
FIG. 11 shows a circuit diagram of a second left voltage control circuit of the voltage controller of the system of FIG. 7.
Figure 12:
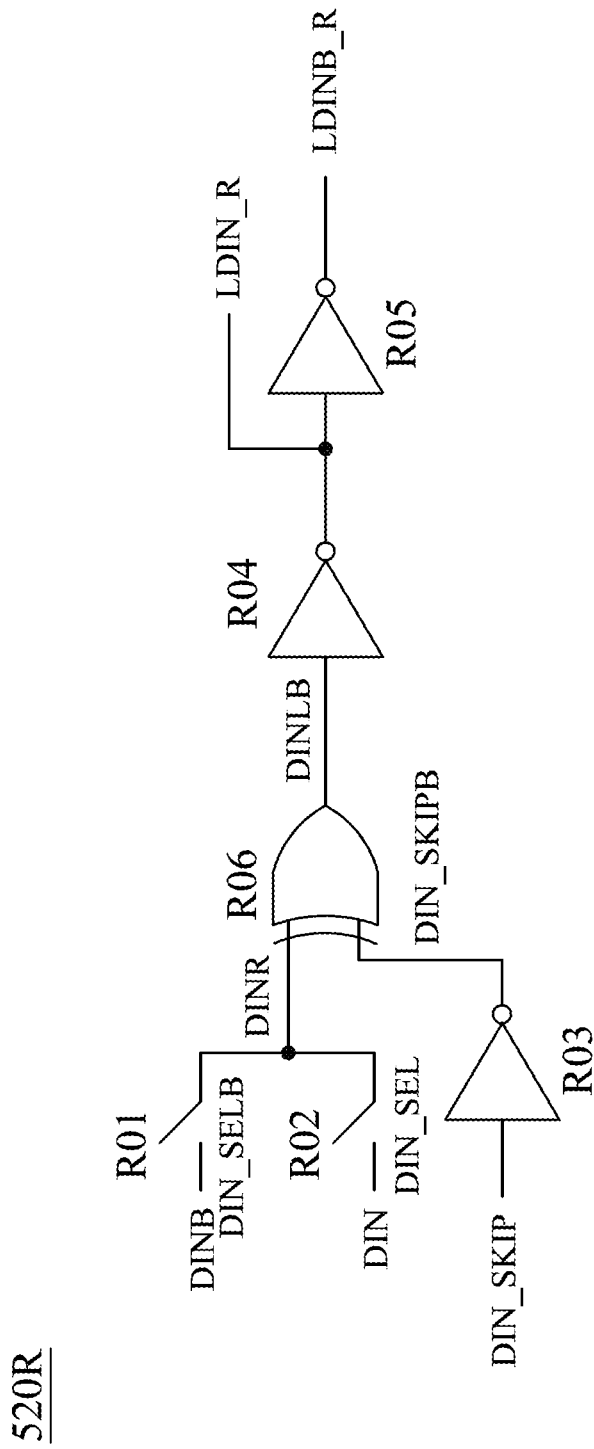
FIG. 12 shows a circuit diagram of a second right voltage control circuit of the voltage controller of the system of FIG. 7.
Figure 13:
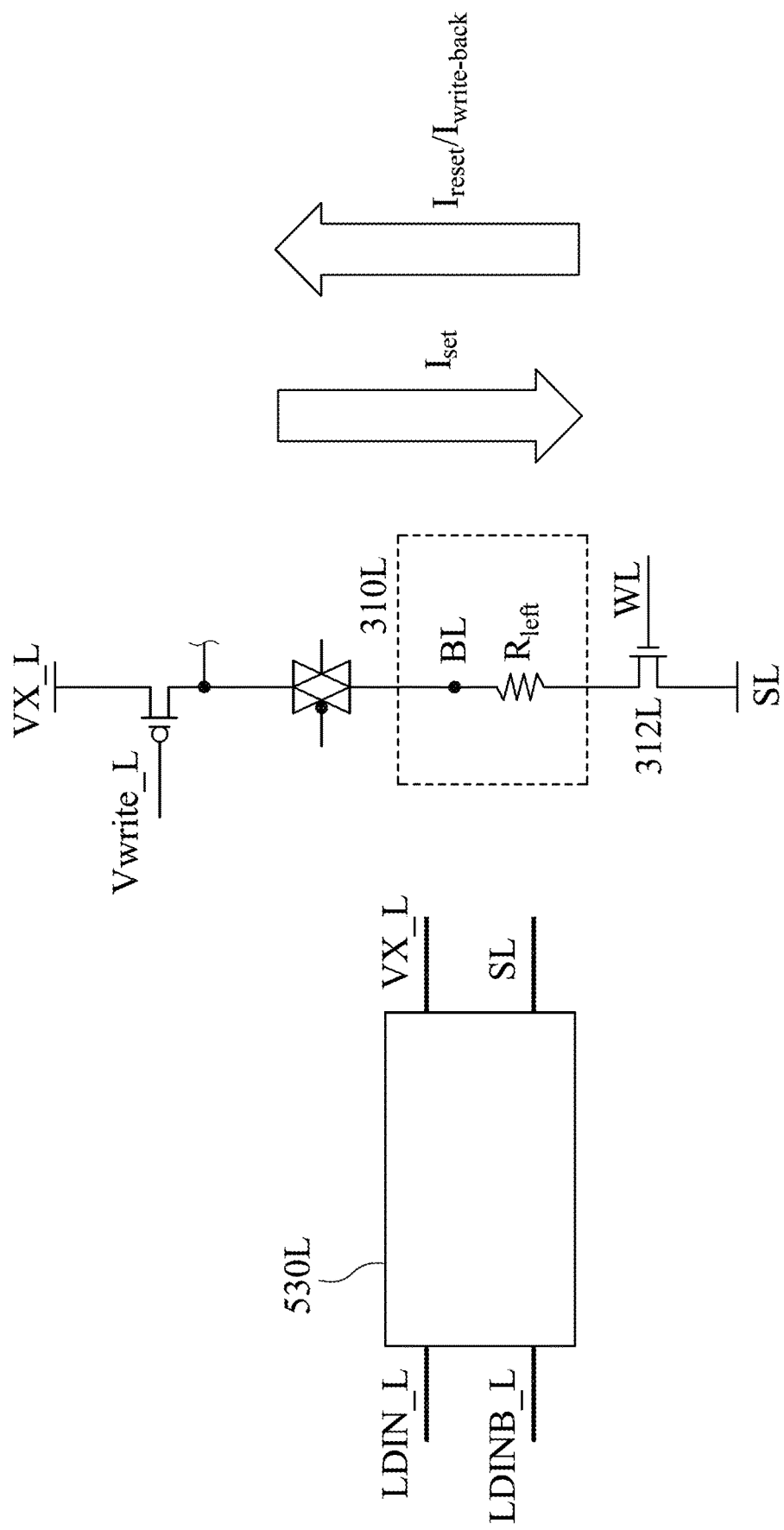
FIG. 13 shows a schematic view of a third left voltage control circuit of the voltage controller of the system of FIG. 7.
Figure 14:
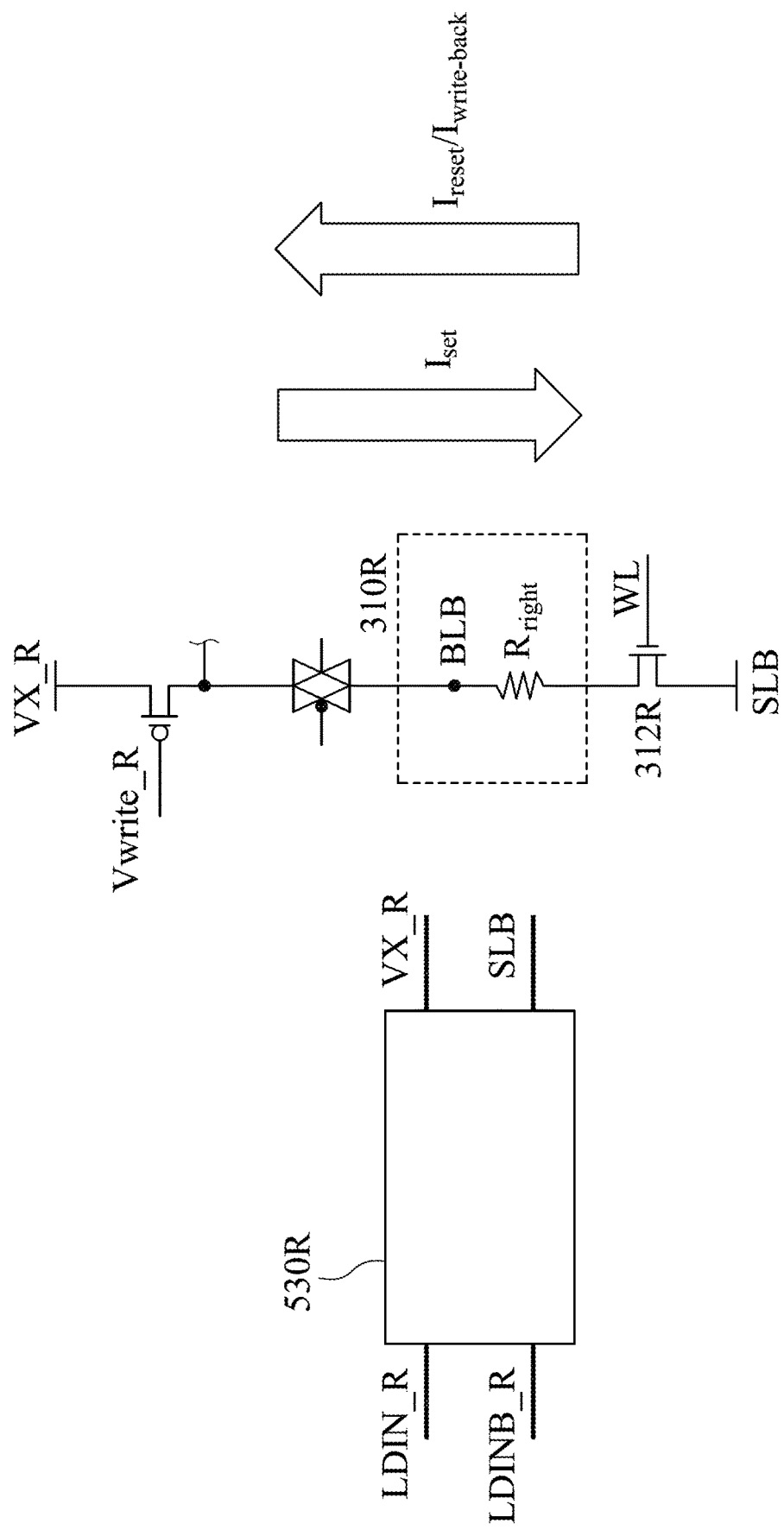
FIG. 14 shows a schematic view of a third right voltage control circuit of the voltage controller of the system of FIG. 7.

FIG. 7 shows a block diagram of a system 200 for performing a physical unclonable function generated by a non-volatile memory write delay difference according to a second embodiment of the present disclosure. FIG. 8 shows a circuit diagram of a physical unclonable function cell unit 300 and two flag generators 400L, 400R of the system 200 for performing the physical unclonable function generated by the non-volatile memory write delay difference of FIG. 7. FIG. 9 shows a circuit diagram of an operational amplifier 410 of each of the two flag generators 400L, 400R of FIG. 8. FIG. 10 shows a circuit diagram of a first voltage control circuit 510 of a voltage controller 500 of the system 200 of FIG. 7. FIG. 11 shows a circuit diagram of a second left voltage control circuit 520L of the voltage controller 500 of the system 200 of FIG. 7. FIG. 12 shows a circuit diagram of a second right voltage control circuit 520R of the voltage controller 500 of the system 200 of FIG. 7. FIG. 13 shows a schematic view of a third left voltage control circuit 530L of the voltage controller 500 of the system 200 of FIG. 7. FIG. 14 shows a schematic view of a third right voltage control circuit 530R of the voltage controller 500 of the system 200 of FIG. 7. In FIGS. 7-14, the system 200 for performing the physical unclonable function generated by the non-volatile memory write delay difference includes the physical unclonable function cell unit 300, the two flag generators 400L, 400R and the voltage controller 500.

The physical unclonable function cell unit 300 includes two non-volatile memory cells 310L, 310R, a first control transistor 312L and a second control transistor 312R. The two non-volatile memory cells 310L, 310R are controlled by a bit line BL and a bit line bar BLB, respectively, as shown in FIG. 8. In detail, the two non-volatile memory cells 310L, 310R include a first magnetic tunnel junction element $R_{left}$ and a second magnetic tunnel junction element $R_{right}$, respectively. The first control transistor 312L is connected to a source line SL. The first magnetic tunnel junction element $R_{left}$ is connected between the first control transistor 312L and the bit line BL. The second control transistor 312R is connected to a source line bar SLB. The second magnetic tunnel junction element $R_{right}$ is connected between the second control transistor 312R and the bit line bar BLB. The first control transistor 312L and the second control transistor 312R are controlled by a word line WL.

The two flag generators 400L, 400R are electrically connected to the two non-volatile memory cells 310L, 310R, respectively. Each of the two flag generators 400L, 400R is configured to detect a voltage drop of one of the bit line BL and the bit line bar BLB, and compare the voltage drop and a predetermined voltage difference value to generate a comparison flag (Flag_L or Flag_R), as shown in FIG. 8. In detail, each of the two flag generators 400L, 400R includes a first transistor T1, a transmission gate TG, a capacitor C, a switch Pro_SW, a second transistor T2, a third transistor T3 and an operational amplifier 410. The first transistor T1 is connected to a voltage control node (VX_L or VX_R) and a first node n1. The first transistor T1 is controlled by one of two write voltages Vwrite_L, Vwrite_R. The transmission gate TG is connected between the first node n1 and one of the bit line BL and the bit line bar BLB. The capacitor C is connected between the first node n1 and a second node n2. The switch Pro_SW is connected between the second node n2 and a third node n3. The second transistor T2 is connected to the power supply voltage VDD, the second node n2 and the third node n3. The third transistor T3 is connected to the ground voltage VSS, the second node n2 and the third node n3. The operational amplifier 410 is connected to the third node n3 and configured to generate the comparison flag (Flag_L or Flag_R) according to the voltage level of the third node n3. Each of the first transistor T1 and the second transistor T2 is the PMOS transistor. The third transistor T3 is the NMOS transistor. The two flag generators 400L, 400R are configured to implement the detecting step S03 of the method 100 of FIG. 1.

In FIG. 9, the operational amplifier 410 includes seven transistors 411, 412, 413, 414, 415, 416, 417 and an inverter 418. The transistor 411 is coupled between the power supply voltage VDD and a fourth node n4. The transistor 412 is coupled between the fourth node n4 and a fifth node n5. The transistor 413 is coupled between the fifth node n5 and a sixth node n6. The transistor 414 is coupled between the sixth node n6 and the ground voltage VSS. The transistor 415 is coupled between the fourth node n4 and the ground voltage VSS. The transistor 416 is coupled between the sixth node n6 and the power supply voltage VDD. The transistor 416 is coupled between the power supply voltage VDD and the fifth node n5. The transistors 411, 412, 413, 414 are controlled by the third node n3. The transistors 415, 416 are controlled by the fifth node n5. The transistor 417 is controlled by an inverted switch signal Pro_SW_WTB which is opposite to a switch signal Pro_SW_WT of the switch Pro_SW. The inverter 418 is connected to the fifth node n5. The comparison flag (Flag_L or Flag_R) is generated by the inverter 418 according to the voltage level of the fifth node n5. Each of the transistors 411, 412, 415, 417 is the PMOS transistor. Each of the transistors 413, 414, 416 is the NMOS transistor.

The voltage controller 500 is electrically connected to the physical unclonable function cell unit 300 and the two flag generators 400L, 400R. The voltage controller 500 is configured to implement steps of the method 100. In other words, the voltage controller 500 is configured to implement the resetting step S01, the writing step S02, the terminating step S042, the write-back operating step S044 and the write-back terminating step S05 of the method 100 of FIG. 1. In the resetting step S01, the voltage controller 500 is configured to control the voltage levels of the bit line BL, the bit line bar BLB, the source line SL and the source line bar SLB of the two flag generators 400L, 400R to reset the two non-volatile memory cells 310L, 310R via the reset current $I_{reset}$. In the writing step S02, the voltage controller 500 is configured to control the voltage levels of the bit line BL, the bit line bar BLB, the source line SL and the source line bar SLB of the two flag generators 400L, 400R to perform the write operation on each of the two non-volatile memory cell via the set current $I_{set}$. The voltage controller 500 is configured to apply the set current $I_{set}$ to each of the two non-volatile memory cells 310L, 310R so as to set the one of the two non-volatile memory cells 310L, 310R to a parallel state. In the terminating step S042, the voltage controller 500 is configured to control the voltage levels of the bit line BL, the bit line bar BLB, the source line SL and the source line bar SLB of the two flag generators 400L, 400R to terminate the write operation on one of the two non-volatile memory cells 310L, 310R according to the comparison flag (Flag_L or Flag_R). In the write-back operating step S044, the voltage controller 500 is configured to control the voltage levels of the bit line BL, the bit line bar BLB, the source line SL and the source line bar SLB of the two flag generators 400L, 400R to perform the write-back operation on another of the two non-volatile memory cells 310L, 310R. The voltage controller 500 is configured to apply the write-back current $I_{write\text{-}back}$ to the another of the two non-volatile memory cells 310L, 310R so as to set the another of the two non-volatile memory cells 310L, 310R to the anti-parallel state. The write-back current $I_{write\text{-}back}$ and the set current $I_{set}$ flow in opposite directions. In the write-back terminating step S05, the voltage controller 500 is configured to control the voltage levels of the bit line BL, the bit line bar BLB, the source line SL and the source line bar SLB of the two flag generators 400L, 400R to terminate the write-back operation on the another of the two non-volatile memory cells 310L, 310R.

In detail, the voltage controller 500 includes a first voltage control circuit 510, a second left voltage control circuit 520L, a second right voltage control circuit 520R, a third left voltage control circuit 530L and a third right voltage control circuit 530R.

The first voltage control circuit 510 includes five inverters 511, 514, 515, 517, 519, two AND gates 512, 513, an exclusive OR (XOR) gate 516 and a NAND gate 518, as shown in FIG. 10. The inverter 511 is connected to the two AND gates 512, 513. The inverter 511 receives the switch signal Pro_SW_WT of the switch Pro_SW and then generates the inverted switch signal Pro_SW_WTB. The AND gate 512 is connected between the inverter 511 and the inverter 514. The AND gate 512 receives the inverted switch signal Pro_SW_WTB and the comparison flag Flag_L, and then generates a left flag signal SWT_flag_L. The inverter 514 is connected between the AND gate 512 and the XOR gate 516. The inverter 514 receives the left flag signal SWT_flag_L and then generates an inverted left flag signal SWT_flagB_L. The AND gate 513 is connected between the inverter 511 and the inverter 515. The AND gate 513 receives the inverted switch signal Pro_SW_WTB and the comparison flag Flag_R, and then generates a right flag signal SWT_flag_R. The inverter 515 is connected between the AND gate 513 and the XOR gate 516. The inverter 515 receives the right flag signal SWT_flag_R and then generates an inverted right flag signal SWT_flagB_R. The XOR gate 516 is connected among the inverters 514, 515, 517. The XOR gate 516 receives the inverted left flag signal SWT_flagB_L and the inverted right flag signal SWT_flagB_R, and then generates a total flag signal FLAG_TOT. The inverter 517 is connected between the XOR gate 516 and the NAND gate 518. The inverter 517 receives the total flag signal FLAG_TOT and then generates an inverted total flag signal FLAG_TOTB. The NAND gate 518 is connected between the inverter 517 and the inverter 519. The NAND gate 518 receives an enabling signal PUF_EN and the inverted total flag signal FLAG_TOTB, and then generates an inverted input selecting signal DIN_SELB. The inverter 519 receives the inverted input selecting signal DIN_SELB and then generates an input selecting signal DIN_SEL.

The second left voltage control circuit 520L is connected between the first voltage control circuit 510 and the third left voltage control circuit 530L. The second left voltage control circuit 520L includes two switches L01, L02 and three inverters L03, L04, L05, as shown in FIG. 11. The two switches L01, L02 are connected to a digital input signal DIN and an inverted digital input signal DINB, respectively. The two switches L01, L02 are switched by the inverted input selecting signal DIN_SELB and the input selecting signal DIN_SEL, respectively. The inverter L03 is connected among the two switches L01, L02 and the inverter L04. The inverter L04 is connected between the inverter L03 and the inverter L05. Finally, the inverter L04 and the inverter L05 generate a left digital input signal LDIN_L and an inverted left digital input signal LDINB_L, respectively, according to the digital input signal DIN, the inverted digital input signal DINB, the inverted input selecting signal DIN_SELB and the input selecting signal DIN_SEL.

The second right voltage control circuit 520R is connected between the first voltage control circuit 510 and the third right voltage control circuit 530R. The second right voltage control circuit 520R includes two switches R01, R02, three inverters R03, R04, R05 and an XOR gate R06, as shown in FIG. 12. The two switches R01, R02 are connected to the inverted digital input signal DINB and the digital input signal DIN, respectively. The two switches R01, R02 are switched by the inverted input selecting signal DIN_SELB and the input selecting signal DIN_SEL, respectively. The inverter R03 is connected to the XOR gate R06. The inverter R03 receives an input skip signal DIN_SKIP and then generates an inverted input skip signal DIN_SKIPB. The XOR gate R06 is connected between the inverter R03 and the inverter R04. The inverter R04 is connected between the XOR gate R06 and the inverter R05. Finally, the inverter R04 and the inverter R05 generate a right digital input signal LDIN_R and an inverted right digital input signal LDINB_R, respectively, according to the digital input signal DIN, the inverted digital input signal DINB, the inverted input selecting signal DIN_SELB, the input selecting signal DIN_SEL and the input skip signal DIN_SKIP.

The third left voltage control circuit 530L is connected to the second left voltage control circuit 520L via the left digital input signal LDIN_L and the inverted left digital input signal LDINB_L. The third left voltage control circuit 530L is connected to the flag generator 400L via the voltage control node VX_L. The third left voltage control circuit 530L is connected to the first control transistor 312L via the source line SL. In FIG. 13, the third left voltage control circuit 530L receives the left digital input signal LDIN_L and the inverted left digital input signal LDINB_L, and then generates the voltages on the voltage control node VX_L and the source line SL according to the left digital input signal LDIN_L and the inverted left digital input signal LDINB_L. Table 1 lists the relationships among the voltage levels of the left digital input signal LDIN_L, the inverted left digital input signal LDINB_L, the voltage control node VX_L and the source line SL. When the voltage levels of the left digital input signal LDIN_L and the inverted left digital input signal LDINB_L are equal to 1 and 0, respectively, the voltage levels of the voltage control node VX_L and the source line SL are set to be a high voltage (i.e., High V) and 0, respectively. The high voltage is greater than the power supply voltage VDD. The set current $I_{set}$ flowing downwardly through the transmission gate TG may be applied to the non-volatile memory cell 310L. On the contrary, when the voltage levels of the left digital input signal LDIN_L and the inverted left digital input signal LDINB_L are equal to 0 and 1, respectively, the voltage levels of the voltage control node VX_L and the source line SL are set to be 0 and the high voltage, respectively. The reset current $I_{reset}$ or the write-back current $I_{write-back}$ flowing upwardly through the transmission gate TG may be applied to the non-volatile memory cell 310L. The reset current $I_{reset}$ and the set current $I_{set}$ flow in opposite directions. The reset current $I_{reset}$ and the write-back current $I_{write-back}$ flow in the same direction.

TABLE 1

| LDIN_L | LDINB_L | VX_L | SL |
|---|---|---|---|
| VDD (1) | VSS (0) | High V | 0 |
| VSS (0) | VDD (1) | 0 | High V |

The third right voltage control circuit 530R is connected to the second right voltage control circuit 520R via the right digital input signal LDIN_R and the inverted right digital input signal LDINB_R. The third right voltage control circuit 530R is connected to the flag generator 400R via the voltage control node VX_R. The third right voltage control circuit 530R is connected to the second control transistor 312R via the source line bar SLB. In FIG. 14, the third right voltage control circuit 530R receives the right digital input signal LDIN_R and the inverted right digital input signal LDINB_R, and then generates the voltages on the voltage control node VX_R and the source line bar SLB according to the right digital input signal LDIN_R and the inverted right digital input signal LDINB_R. Table 2 lists the relationships among the voltage levels of the right digital input signal LDIN_R and the inverted right digital input signal LDINB_R, the voltage control node VX_R and the source line bar SLB. When the voltage levels of the right digital input signal LDIN_R and the inverted right digital input signal LDINB_R are equal to 1 and 0, respectively, the voltage levels of the voltage control node VX_R and the source line bar SLB are set to be the high voltage and 0, respectively. The set current $I_{set}$ flowing downwardly through the transmission gate TG may be applied to the non-volatile memory cell 310R. On the contrary, when the voltage levels of the right digital input signal LDIN_R and the inverted right digital input signal LDINB_R are equal to 0 and 1, respectively, the voltage levels of the voltage control node VX_R and the source line bar SLB are set to be 0 and the high voltage, respectively. The reset current $I_{reset}$ or the write-back current $I_{write-back}$ flowing upwardly through the transmission gate TG may be applied to the non-volatile memory cell 310R. The reset current $I_{reset}$ and the set current $I_{set}$ flow in opposite directions. The reset current $I_{reset}$ and the write-back current $I_{write-back}$ flow in the same direction.

TABLE 2

| LDIN_R | LDINB_R | VX_R | SLB |
|---|---|---|---|
| VDD (1) | VSS (0) | High V | 0 |
| VSS (0) | VDD (1) | 0 | High V |

Figure 15:
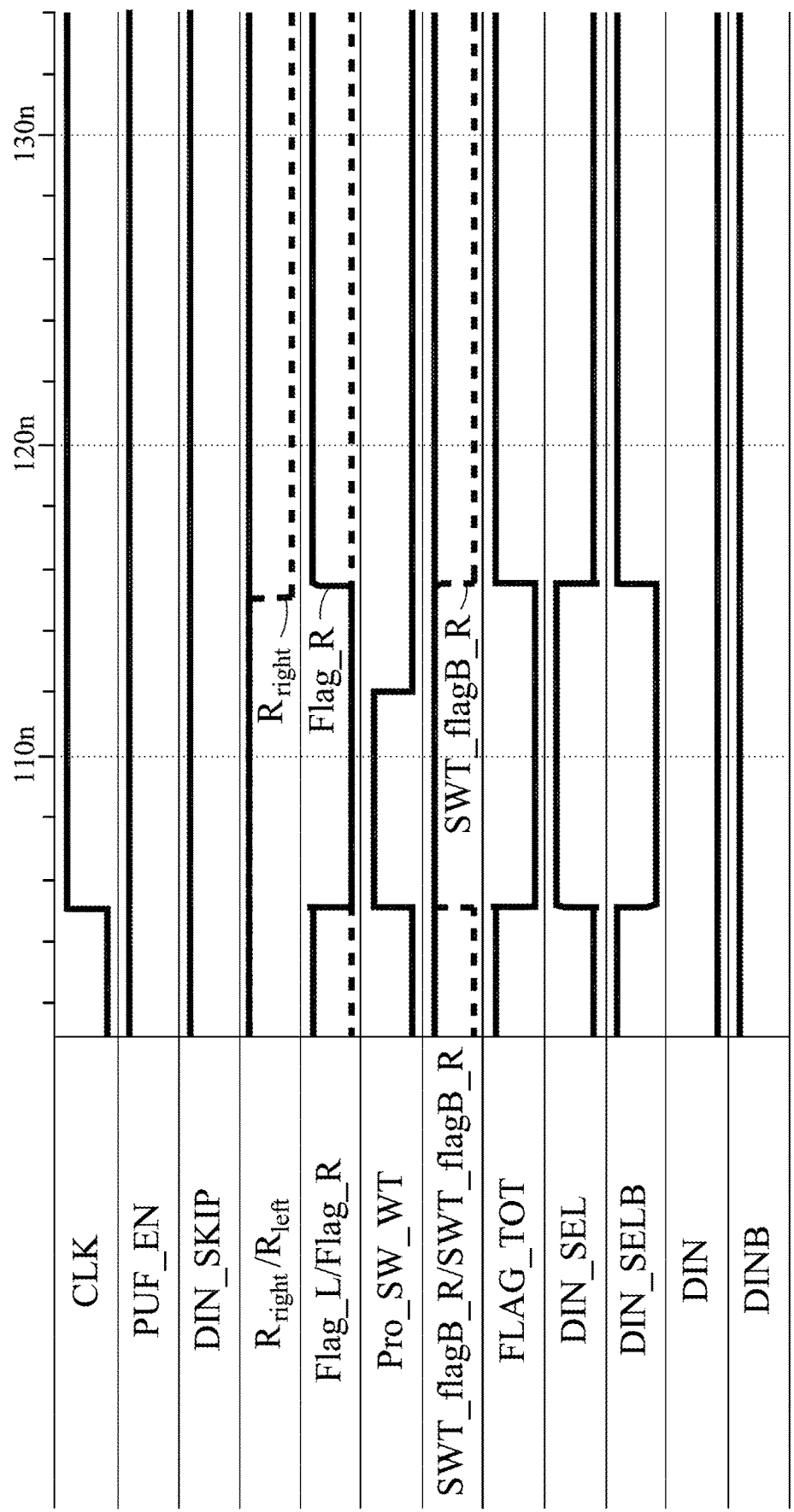
FIG. 15 shows a timing diagram associated with the system and circuits of FIGS. 7-14.

FIG. 15 shows a timing diagram associated with the system 200 and circuits of FIGS. 7-14. For example, when the second magnetic tunnel junction element $R_{right}$ is first switched from the anti-parallel state to the parallel state, the voltage drop of the bit line BL is greater than or equal to the predetermined voltage difference value, so that the comparison flag Flag_R is changed from 0 to 1. In FIGS. 10 and 15, the comparison flag Flag_R is triggered, and the right flag signal SWT_flag_R and the left flag signal SWT_flag_L are set to be 1 and 0, respectively. The inverted right flag signal SWT_flagB_R and the inverted left flag signal SWT_flagB_L are set to be 0 and 1, respectively. The total flag signal FLAG_TOT and the inverted total flag signal FLAG_TOTB are set to be 1 and 0, respectively. If the enabling signal PUF_EN is equal to 1, the inverted input selecting signal DIN_SELB and the input selecting signal DIN_SEL are set to be 1 and 0, respectively. In FIGS. 11 and 15, if the digital input signal DIN, the inverted digital input signal DINB and the input skip signal DIN_SKIP are equal to 0, 1 and 1, respectively, a left internal signal DINL and an inverted left internal signal DINLB are set to be 1 and 0, respectively. The left digital input signal LDIN_L and the inverted left digital input signal LDINB_L are set to be 1 and 0, respectively. In FIGS. 12 and 15, a right internal signal DINR and an inverted right internal signal DINLB are both set to be 1. The right digital input signal LDIN_R and the inverted right digital input signal LDINB_R are set to be 0 and 1, respectively. In FIGS. 13 and 15, when the left digital input signal LDIN_L and the inverted left digital input signal LDINB_L are equal to 1 and 0, respectively, the voltage levels of the voltage control node VX_L and the source line SL are set to be the high voltage and 0, respectively, by the third left voltage control circuit 530L. The voltage level of the bit line BL may be set to be 0 via the transmission gate TG and the write voltage Vwrite_L, as shown in Case 1 of FIG. 5. In FIGS. 14 and 15, when the right digital input signal LDIN_R and the inverted right digital input signal LDINB_R are equal to 0 and 1, respectively, the voltage levels of the voltage control node VX_R and the source line bar SLB are set to be 0 and the high voltage, respectively, by the third right voltage control circuit 530R. The write-back current $I_{write-back}$ may be applied to the non-volatile memory cell 310R, as shown in Case 1 of FIG. 5.

Therefore, the system 200 of the present disclosure utilizes the comparison flag (Flag_R and Flag_L) to efficiently monitor whether the one of the two non-volatile memory cells 310L, 310R is successfully written or not. The system 200 of the present disclosure can not only read each of the two non-volatile memory cells 310L, 310R but also provide the write-back operation that enables the two non-volatile memory cells 310L, 310R in each physical unclonable function cell unit exist in complementary state so as to decrease the unstable bits. By combining the read circuit and the write circuit, the system 200 of the present disclosure utilizes the read write combined scheme to greatly decrease the area overhead.

Figure 16:
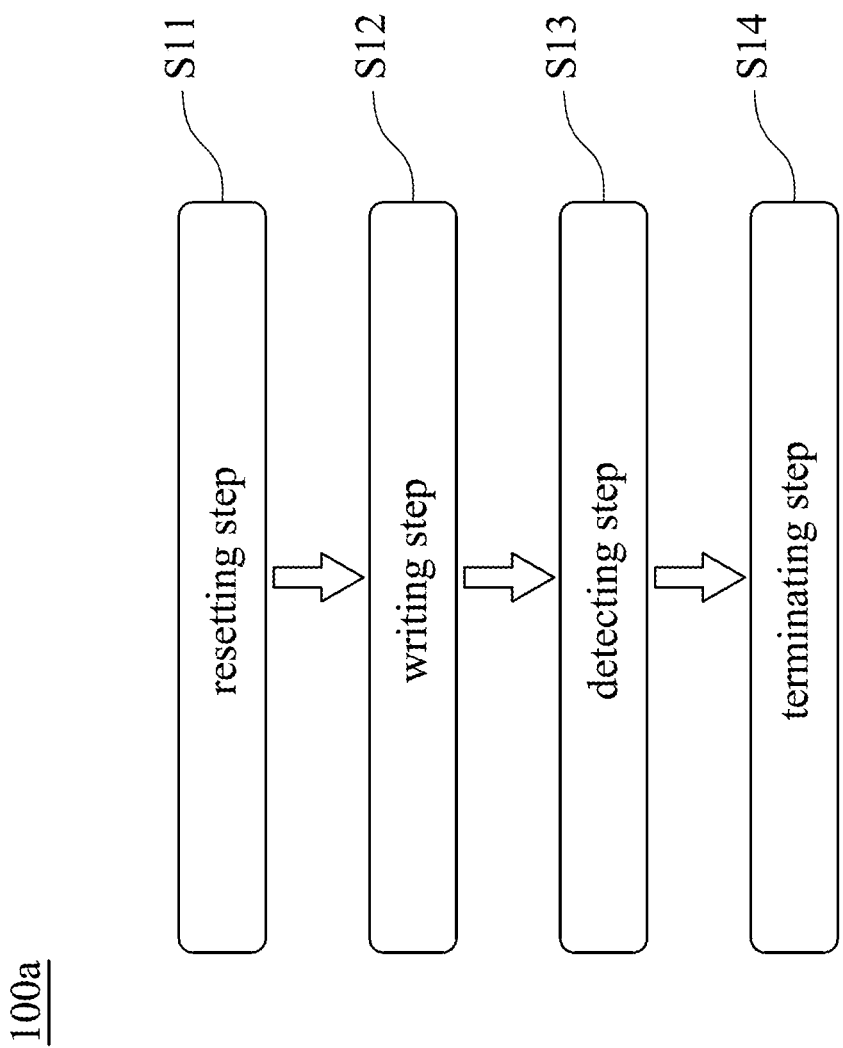
FIG. 16 shows a flow chart of a method for performing a physical unclonable function generated by a non-volatile memory write delay difference according to a third embodiment of the present disclosure.

FIG. 16 shows a flow chart of a method 100a for performing a physical unclonable function generated by a non-volatile memory write delay difference according to a third embodiment of the present disclosure. In FIGS. 2-4, 6 and 16, the method 100a for performing the physical unclonable function generated by the non-volatile memory write delay difference includes a resetting step S11, a writing step S12, a detecting step S13 and a terminating step S14.

The resetting step S11 includes resetting two non-volatile memory cells 310L, 310R, and the two non-volatile memory cells 310L, 310R are controlled by a bit line BL and a bit line bar BLB, respectively. The operation of the resetting step S11 is the same as the operation of the resetting step S01 of FIG. 2.

The writing step S12 includes performing a write operation on each of the two non-volatile memory cells 310L, 310R. The operation of the writing step S12 is the same as the operation of the writing step S02 of FIG. 3.

The detecting step S13 includes detecting a voltage drop of each of the bit line BL and the bit line bar BLB, and comparing the voltage drop and a predetermined voltage difference value to generate a comparison flag (Flag_L or Flag_R). The operation of the detecting step S13 is the same as the operation of the detecting step S03 of FIG. 4.

The terminating step S14 includes terminating the write operation on each of the two non-volatile memory cells 310L, 310R according to the comparison flag (Flag_L or Flag_R). The operation of the terminating step S14 is similar as the operation of the write-back terminating step S05 of FIG. 6. In the terminating step S14, the voltage levels of the bit line BL, the source line SL, the bit line bar BLB and the source line bar SLB are applied to zero.

Therefore, the method 100a of the present disclosure can set the two non-volatile memory cells 310L, 310R to the anti-parallel state and the parallel state, respectively, as long as the comparison flag Flag_L and the comparison flag Flag_R are not changed simultaneously.

According to the aforementioned embodiments and examples, the advantages of the present disclosure are described as follows.

1. The method and the system for performing the physical unclonable function generated by the non-volatile memory write delay difference of the present disclosure can not only read each of the two non-volatile memory cells but also provide the write-back operation that enables the two non-volatile memory cells in each physical unclonable function cell unit exist in complementary state so as to decrease the unstable bits.

2. The method and the system for performing the physical unclonable function generated by the non-volatile memory write delay difference of the present disclosure utilize the comparison flag to efficiently monitor whether the one of the two non-volatile memory cells is successfully written or not.

3. The method and the system for performing the physical unclonable function generated by the non-volatile memory write delay difference of the present disclosure can utilize the read write combined scheme to greatly decrease the area overhead by combining the read circuit and the write circuit.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for performing a physical unclonable function generated by a non-volatile memory write delay difference, comprising:
    performing a resetting step, wherein the resetting step comprises resetting two non-volatile memory cells, and the two non-volatile memory cells are controlled by a bit line and a bit line bar, respectively;
    performing a writing step, wherein the writing step comprises performing a write operation on each of the two non-volatile memory cells;
    performing a detecting step, wherein the detecting step comprises detecting a voltage drop of each of the bit line and the bit line bar, and comparing the voltage drop and a predetermined voltage difference value to generate a comparison flag;
    performing a terminating step, wherein the terminating step comprises terminating the write operation on one of the two non-volatile memory cells according to the comparison flag; and
    performing a write-back operating step, wherein the write-back operating step comprises performing a write-back operation on another of the two non-volatile memory cells.

2. The method for performing the physical unclonable function generated by the non-volatile memory write delay difference of claim 1, wherein the resetting step further comprises:
    resetting each of the two non-volatile memory cells to an anti-parallel state via a reset current passing through each of the bit line and the bit line bar.

3. The method for performing the physical unclonable function generated by the non-volatile memory write delay difference of claim 2, wherein the write operation of the writing step comprises:
    applying a set current to each of the two non-volatile memory cells, wherein the set current passes through each of the bit line and the bit line bar, and the set current and the reset current flow in opposite directions.

4. The method for performing the physical unclonable function generated by the non-volatile memory write delay difference of claim 3, wherein the terminating step further comprises:
    in response to determining that the voltage drop of one of the bit line and the bit line bar is greater than or equal to the predetermined voltage difference value, terminating the write operation on the one of the two non-volatile memory cells by applying a voltage level of the one of the bit line and the bit line bar to zero, and setting the one of the two non-volatile memory cells to a parallel state.

5. The method for performing the physical unclonable function generated by the non-volatile memory write delay difference of claim 4, wherein the write-back operation of the write-back operating step comprises:
    applying a write-back current to the another of the two non-volatile memory cells so as to set the another of the two non-volatile memory cells to the anti-parallel state, wherein the write-back current passes through another of the bit line and the bit line bar, and the write-back current and the set current flow in opposite directions.

6. The method for performing the physical unclonable function generated by the non-volatile memory write delay difference of claim 1, wherein the steps of the method are carried out in order of the resetting step, the writing step, the detecting step and the terminating step, and the terminating step and the write-back operating step are carried out simultaneously.

7. The method for performing the physical unclonable function generated by the non-volatile memory write delay difference of claim 1, wherein the detecting step further comprises:
    in response to determining that the voltage drop of one of the bit line and the bit line bar is greater than or equal to the predetermined voltage difference value, changing the comparison flag;
    in response to determining that the voltage drop of one of the bit line and the bit line bar is smaller than the predetermined voltage difference value, unchanging the comparison flag.

8. The method for performing the physical unclonable function generated by the non-volatile memory write delay difference of claim 1, wherein the detecting step further comprises:
    in response to determining that the voltage drop of each of the bit line and the bit line bar is smaller than the predetermined voltage difference value, maintaining the write operation on each of the bit line and the bit line bar.

9. A method for performing a physical unclonable function generated by a non-volatile memory write delay difference, comprising:
    performing a resetting step, wherein the resetting step comprises resetting two non-volatile memory cells, and the two non-volatile memory cells are controlled by a bit line and a bit line bar, respectively;
    performing a writing step, wherein the writing step comprises performing a write operation on each of the two non-volatile memory cells;
    performing a detecting step, wherein the detecting step comprises detecting a voltage drop of each of the bit line and the bit line bar, and comparing the voltage drop and a predetermined voltage difference value to generate a comparison flag; and
    performing a terminating step, wherein the terminating step comprises terminating the write operation on each of the two non-volatile memory cells according to the comparison flag.

10. The method for performing the physical unclonable function generated by the non-volatile memory write delay difference of claim 9, wherein the resetting step further comprises:
    resetting each of the two non-volatile memory cells to an anti-parallel state via a reset current passing through each of the bit line and the bit line bar.

11. The method for performing the physical unclonable function generated by the non-volatile memory write delay difference of claim 10, wherein the write operation of the writing step comprises:
    applying a set current to each of the two non-volatile memory cells, wherein the set current passes through each of the bit line and the bit line bar, and the set current and the reset current flow in opposite directions.

12. The method for performing the physical unclonable function generated by the non-volatile memory write delay difference of claim 9, wherein the terminating step further comprises:
in response to determining that the voltage drop of one of the bit line and the bit line bar is greater than or equal to the predetermined voltage difference value, terminating the write operation on each of the two non-volatile memory cells by applying a voltage level of each of the bit line and the bit line bar to zero, and setting the two non-volatile memory cells to an anti-parallel state and a parallel state, respectively.

13. The method for performing the physical unclonable function generated by the non-volatile memory write delay difference of claim 9, wherein the steps of the method are carried out in order of the resetting step, the writing step, the detecting step and the terminating step.

14. The method for performing the physical unclonable function generated by the non-volatile memory write delay difference of claim 9, wherein the detecting step further comprises:
in response to determining that the voltage drop of one of the bit line and the bit line bar is greater than or equal to the predetermined voltage difference value, the comparison flag is changed;
in response to determining that the voltage drop of one of the bit line and the bit line bar is smaller than the predetermined voltage difference value, the comparison flag is unchanged.

15. The method for performing the physical unclonable function generated by the non-volatile memory write delay difference of claim 9, wherein the detecting step further comprises:
in response to determining that the voltage drop of each of the bit line and the bit line bar is smaller than the predetermined voltage difference value, maintaining the write operation on each of the bit line and the bit line bar.

16. A system for performing a physical unclonable function generated by a non-volatile memory write delay difference, comprising:
a physical unclonable function cell unit comprising two non-volatile memory cells, a first control transistor and a second control transistor, wherein the first control transistor is connected to a source line, the second control transistor is connected to a source line bar, and the two non-volatile memory cells are controlled by a bit line and a bit line bar, respectively;
two flag generators electrically connected to the two non-volatile memory cells, respectively, wherein each of the two flag generators is configured to detect a voltage drop of one of the bit line and the bit line bar, and compare the voltage drop and a predetermined voltage difference value to generate a comparison flag; and
a voltage controller electrically connected to the physical unclonable function cell unit and the two flag generators, wherein the voltage controller is configured to implement steps of a method comprising:
resetting two non-volatile memory cells;
performing a write operation on each of the two non-volatile memory cells; and
terminating the write operation on one of the two non-volatile memory cells according to the comparison flag.

17. The system for performing the physical unclonable function generated by the non-volatile memory write delay difference of claim 16, wherein the two non-volatile memory cells comprise:
a first magnetic tunnel junction element connected between the first control transistor and the bit line; and
a second magnetic tunnel junction element connected between the second control transistor and the bit line bar.

18. The system for performing the physical unclonable function generated by the non-volatile memory write delay difference of claim 17, wherein each of the two flag generators comprises:
a first transistor connected to a voltage control node and a first node;
a transmission gate connected between the first node and one of the bit line and the bit line bar;
a capacitor connected between the first node and a second node;
a switch connected between the second node and a third node;
a second transistor connected to a power supply voltage, the second node and the third node;
a third transistor connected to a ground voltage, the second node and the third node; and
an operational amplifier connected to the third node and configured to generate the comparison flag.

19. The system for performing the physical unclonable function generated by the non-volatile memory write delay difference of claim 16, wherein the voltage controller is configured to control voltage levels of the bit line, the bit line bar, the source line and the source line bar of the two flag generators to perform a write-back operation on another of the two non-volatile memory cells.

20. The system for performing the physical unclonable function generated by the non-volatile memory write delay difference of claim 19, wherein,
the voltage controller is configured to apply a set current to each of the two non-volatile memory cells so as to set the one of the two non-volatile memory cells to a parallel state, and the set current passes through each of the bit line and the bit line bar; and
the voltage controller is configured to apply a write-back current to the another of the two non-volatile memory cells so as to set the another of the two non-volatile memory cells to an anti-parallel state, wherein the write-back current and the set current flow in opposite directions.

* * * * *